United States Patent [19]

Pilarski

[11] Patent Number: 5,407,166

[45] Date of Patent: Apr. 18, 1995

[54] VEHICLE SEAT TRACK ASSEMBLY

[75] Inventor: Regis V. Pilarski, Shelby Township, Macomb County, Mich.

[73] Assignee: General Motors Corporation, Detroit, Mich.

[21] Appl. No.: 153,513

[22] Filed: Nov. 17, 1993

[51] Int. Cl.⁶ ............................................. F16M 13/00
[52] U.S. Cl. ................................... 248/430; 296/65.1
[58] Field of Search ..................... 248/430, 429, 424; 296/65.1

[56] References Cited

U.S. PATENT DOCUMENTS

| | | | |
|---|---|---|---|
| 2,252,218 | 8/1941 | Thoma | 248/430 |
| 2,272,124 | 2/1942 | Lingle | 248/430 |
| 2,921,621 | 1/1960 | Williams et al. | 248/430 |
| 3,847,452 | 11/1974 | Harder, Jr. | 308/6 R |
| 4,004,772 | 1/1977 | Pickles | 248/430 |
| 4,209,159 | 6/1980 | Becker et al. | 248/430 |
| 4,262,963 | 4/1981 | Bauer et al. | 297/473 |
| 4,526,424 | 7/1985 | Korth | 248/430 X |
| 4,601,517 | 7/1986 | Heesch | 297/452 |
| 4,624,498 | 11/1986 | Nagashima et al. | 296/65 R |
| 4,720,073 | 1/1988 | Mann et al. | 248/430 |
| 4,725,032 | 2/1988 | Kazaoka et al. | 248/430 |
| 4,756,503 | 7/1988 | Fujita | 248/430 |
| 4,842,318 | 6/1989 | Fussnegger et al. | 296/65.1 |
| 4,909,560 | 3/1990 | Ginn | 296/65.1 |
| 4,930,736 | 6/1990 | Fourrey et al. | 248/430 |
| 5,048,886 | 9/1991 | Ito et al. | 248/430 X |
| 5,082,228 | 1/1992 | Shimazaki | 248/430 |
| 5,207,473 | 5/1993 | Nawa et al. | 248/430 X |
| 5,292,171 | 3/1994 | Harrell | 297/113 |

Primary Examiner—Ramon O. Ramirez
Attorney, Agent, or Firm—Jeffrey A. Sedlar

[57] ABSTRACT

A vehicle seat adjuster slide assembly. The assembly includes a formed stationary rail for attachment to the vehicle's floor structure and for carrying the remaining components of the assembly. A formed sliding rail mates with the stationary rail and adjustably retains a seat within the vehicle. The two rails are stably and slidably engaged through their respective cross sectional features, rollers and sliding bushings.

6 Claims, 2 Drawing Sheets

VEHICLE SEAT TRACK ASSEMBLY

BACKGROUND OF THE INVENTION

This invention involves a seat adjuster, more particularly, a rail and bearing assembly for the slide mechanism of an adjustably positioned vehicle seat.

Automotive seats have long been designed for mounting on an adjuster so that the seat can be adjustably positioned between fore and aft locations to meet the occupant's convenience. The combination of the adjuster assembly and the seat assembly is fairly complex and can be costly to manufacture. Several mechanisms have been used to perform the adjuster function, the most common of which includes a pair of stationary or guide rails mounted to the vehicle that engage a pair of complementary moving or slide rails connected to the seat. This type of arrangement adequately performs the major functions required of an adjuster mechanism. First and foremost, when equipped with a slide lock it generally holds the seat securely in position within the vehicle. Second the mechanism allows the seat to slide forwardly and rearwardly. Additionally, the channel construction can be formed relatively inexpensively.

As automobiles evolve however, new considerations come into play. More efficient utilization of the space within a vehicle is now required. The adjuster mechanism now is preferably amenable to both manual and power operation. A lower movement effort is preferable, but must be achieved without sacrificing structural stability. The cost of producing a mechanism has become an increasing factor in design as has the size and weight of the mechanism. Finally, with the development of anchoring seat belts to the seat assembly rather than to the vehicle itself, greater strength is required of the adjuster mechanism.

A variety of efforts to design mechanisms meeting many of the above requirements have been made. Mechanisms have been developed using roll formed sheet metal for the rails as well as others using extruded metal rails. Numerous rail configurations and types of bearing arrangements have been used to provide properly functioning seat adjusters. There remains a need however, for an adjuster with low and consistent slide effort requirements, that is relatively compact in size, has high stability, is capable of mounting on the rocker and center tunnel of a vehicle floor and can be relatively inexpensively fabricated from sheet metal.

SUMMARY OF THE INVENTION

The present invention is a distinctive slide assembly for adjustably mounting a seat in a vehicle. The object of the invention is to provide a device that allows the seat to slide forwardly and rearwardly while requiring a relatively low and consistent amount of force to initiate movement; is structurally sturdy to stably hold the seat and adaptable to use in seats with an integral passenger restraint belt; is capable of both manual and power operation; is relatively compact; can be configured for mounting the seat to the rocker and center tunnel of a vehicle floor; and can be fabricated from sheet metal.

A preferred embodiment of the invention includes two formed rails which mate together and are engaged through a unique combination of their respective cross sectional shapes, roller bearings, and sliding plastic bushings. One rail, referred to as the guide rail is stationary and is mounted to the vehicle. The guide rail may be fabricated from a single piece of metal stock, or may be made from two pieces where additional strength is required. The other rail referred to as the slide rail, is slidably coupled to the guide rail and is mounted to the vehicle seat. Two pairs of rails are required for each vehicle seat. The slide rail is contained in the vertical and lateral directions relative to the guide rail by its cross sectional shape which is designed to mate with the cross sectional shape of the guide rail. A combination of rollers and bushings is carried between the rails to provide a stable assembly while allowing the slide rail to easily and consistently slide along the guide rail in the longitudinal direction. This design is amenable to the integration of a safety belt into the seat assembly.

In the preferred embodiment the guide rail has a unique triple U-shaped channel configuration. Two of the channels oppose each other from across the rail and provide the means for stably and slidably coupling to the slide rail. This is accomplished by utilizing plastic bushings between flanges of the slide rail and the channels of the guide rail, containing the slide rail in the vertical and lateral directions. The third channel provides a track for rollers that receive a majority of the normal load on the assembly thereby aiding the sliding movement of the rails. The bushings and rollers result in an assembly with a stable, consistent, longitudinal slidability along the length of the sliding portion of the rails. This resulting advantage occurs with the roller-bushing combination and the physical relationship of the rails.

The plastic bushings are preferably made from a tough polymer that can be exposed to moisture and lubricants such as High Density Polyethylene. To provide a combination of vertical and lateral stability with bind free longitudinal slidability the bushings preferably have projecting longitudinal runners with a relatively small cross sectional guide rail contact area. This form of bushing can result in a shearing action of the runner tips during assembly of the components, removing any excessive material from the runners that might otherwise result in binds during movement of the slide rail. There are preferably two sets of runners at the top and bottom contact points between the rails to prevent loosening of the channel set by vertical loads on the seat. Additionally, to avoid binds the remaining runners are located to prevent the bushings from being squeezed by the metal guide rail.

The preferred embodiment of the assembly is arranged for mounting the vehicle seat to the center tunnel and rocker of the vehicle floor. This type of mounting maximizes foot-room for a rear seat passenger, improves the aesthetic appearance of the assembly by being more readily concealed and minimizes the impact of seat mounting requirements on the vehicle underbody.

Other objects, features and advantages of the invention will become apparent from the following description and the presently preferred embodiment thereof.

DETAILED DESCRIPTION OF PREFERRED EMBODIMENTS

Figure 1:
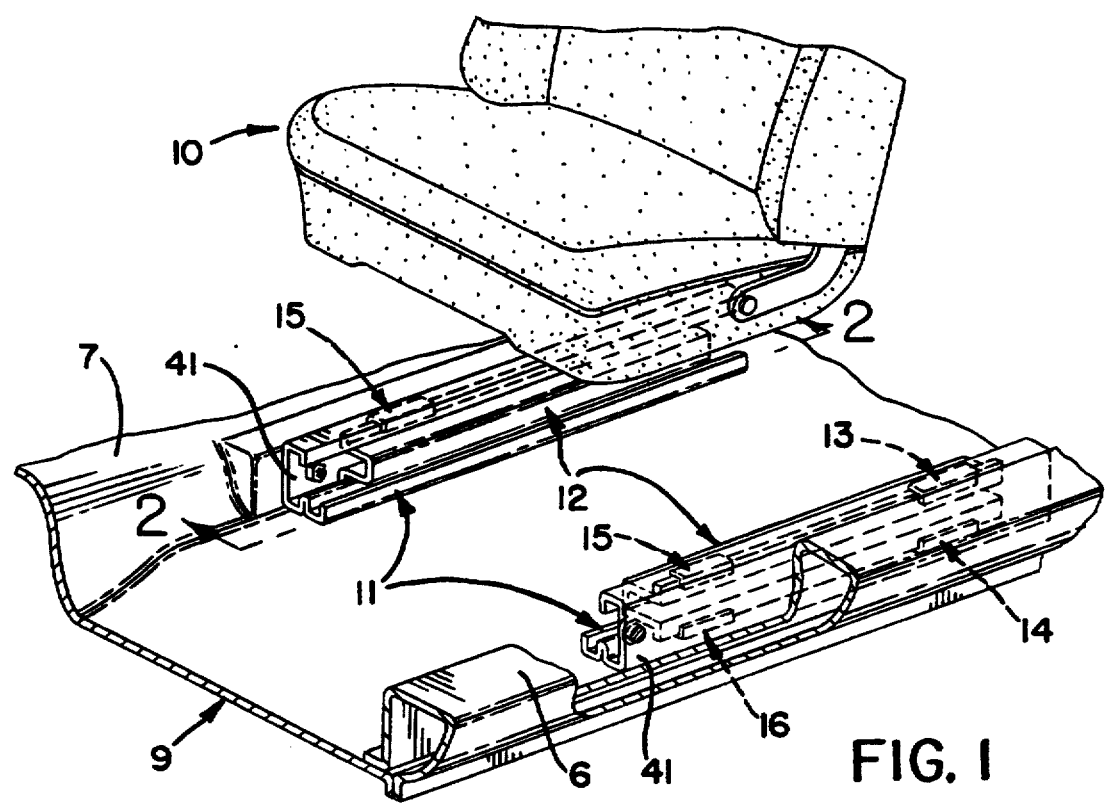
FIG. 1 is a perspective view illustrating the location of the seat adjuster assemblies for attachment of a seat to a vehicle floor.

As shown in FIG. 1, two assemblies are required to mount a vehicle seat 10 to the floor of a vehicle 9. The seat 10, is connected to slide rails 12, and guide rails 11 are connected to the vehicle floor 9.

Figure 3:
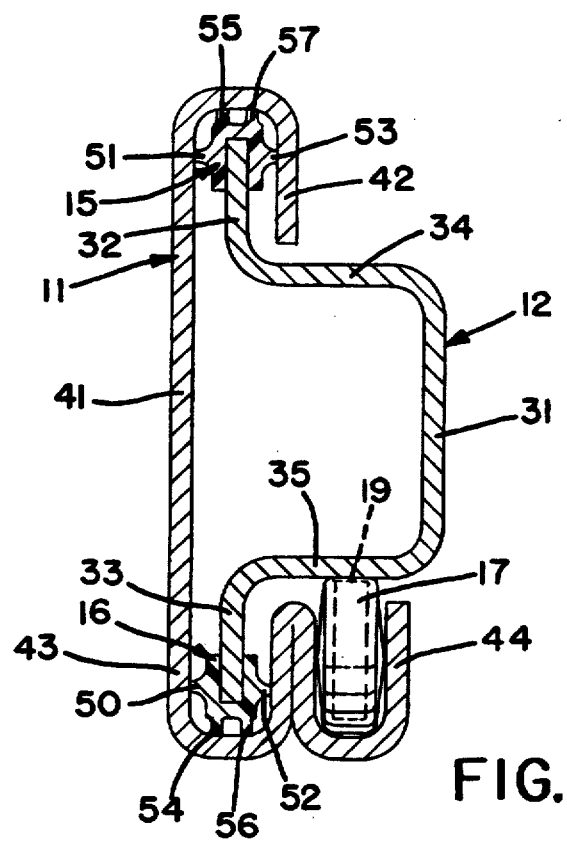
FIG. 3 is a partial schematic sectional view of a preferred embodiment of a seat adjuster slide assembly with a one piece guide rail illustrated in FIG. 2 taken at section 3—3.

FIG. 3 illustrates in cross section the main component parts of a slidable seat adjuster assembly. The component parts include the guide rail 11, that is formed from one piece of roll formed sheet metal. The assembly also includes the slide rail 12, that slidably engages the guide rail 11 through the flanges 32 and 33, bushings 15 and 16 that are retained in place on the flanges, and the roller 17. This unique arrangement of the component parts results in an assembly that provides the required operational features. The large vertical dimension results in higher vertical load bearing capacity. The roller assures that the slide rail will move smoothly longitudinal to the guide rail. The bushings assure that the slide rail is stably contained vertically and laterally with respect to the guide rail. The arrangement of mating rails with a combination of bushings and rollers in the assembly may be constructed in other similar spacial relationships to obtain analogous results.

In the preferred embodiment the guide rail 11 is mounted to the floor of a vehicle 9, as shown in FIG. 1, on or near the center tunnel 7 and the rocker 6. Therefore, the guide rail is stationary in relation to the vehicle. The guide rail is mounted to the vehicle by connecting the guide base wall 41, which is the vertical portion of guide rail 11, to the vehicle through fastening means that may include accessory brackets to spatially position the guide rail 11 in a location determined by the seat design, while providing connection to the contoured surface of the vehicle's floor.

Preferably, along the top and bottom of the guide base wall 41 are three U-shaped channels 42, 43 and 44, that together with the guide base wall 41 constitute the one piece guide rail 11. The top U-shaped channel 42 extends longitudinally along the top of the guide base wall 41, and opens downwardly. The bottom U-shaped channel 43, adjacent to the bottom of the guide base wall 41, extends longitudinally along the bottom of the guide base wall 41 and opens upwardly. The second bottom channel 44 is located adjacent to the first bottom channel 43, further from the guide base wall 41 than the first bottom channel 43. The second bottom channel 44 opens upwardly and extends longitudinally substantially along the length of the guide rail 11, parallel to the first bottom channel 43.

The guide rail is preferably fabricated from sheet metal using a roll forming process. The configuration of the guide rail is the aspect important to proper operation of the adjuster assembly. Therefore, the forming process and composition of the rail are not critical and an extruded rail or otherwise properly formed rail is acceptable, provided the strength of the finished product approximates or surpasses that of roll formed sheet metal.

The slide rail 12 is connected to a vehicle seat shown in FIG. 1 and designated as 10, at the slide face wall 31, to adjustably position the seat within the vehicle. The slide rail 12 includes a slide face wall 31, side walls 34 and 35, and terminal flanges 32 and 33. The slide rail 12 is slidably, engageably connected to the guide rail 11 by the flanges 32 and 33, with bushings 15 and 16 disposed between the rails. The two U-shaped channels 42 and 43, of the guide rail 11, form opposing receptive cavities in which the terminal flanges 32 and 33 of the slide rail 12 are located. The terminal flanges, and thereby the slide rail, are stably contained within the channels both vertically and laterally by the bushings. The roller 17 and the bushings 15 and 16 further enable the integral flanges of the slide rail to consistently slide longitudinally within the channels along the length of the slide portion of the elongated rails. As with the guide rail, the slide rail in the preferred embodiment is fabricated from roll formed sheet metal, although that aspect is not critical to proper operation of the assembly.

The bushings 15 and 16, are fixedly retained in place along the flanges 32 and 33, and slide within the channels 42 and 43. In the preferred embodiment, the bushings are held in place on the slide rail flanges by providing slots in the flanges and by providing a cavity in the bushing for receiving the flange, with webs in the cavity that mate with the flange slots. Preferably, at the top and bottom contact points between the slide rail assembly and the guide rail channels, the bushings have paired projections forming runners identified as 54 through 57. In the preferred embodiment, there are two sets of vertical runner pairs disposed along each bushing. Alternatively, one pair of runners may be provided substantially along the length of the bushing. Runners 54 through 57 contain the slide rail in the vertical direction. Additionally, the runners identified as 50 through 53 contain the slide rail in the lateral direction. The lateral runners are also preferably provided in a set of two on each side of a bushing. Alternatively, one runner may be provided substantially along each side of a bushing.

An advantage of using runners with a relatively small cross-sectional contact area is that a stable engagement with the guide rail 11 results without binding during sliding movement. An unapparent means of arriving at this result occurs during assembly of the component parts of the seat adjuster. In assembly, the bushings 15 and 16 are secured on a formed slide rail 12, then the slide rail is inserted into the formed guide rail 11 from an end. As the slide rail is inserted, if the tips of runners 50-57 extend beyond the cross section of the channel openings defined by the inside edge of the U-shaped channels 42 and 43, a shearing action results and the runner tips will be trimmed by the leading edge of the guide rail channel. The trimming of any runner projecting beyond the space allowed by the channel openings provides an increased stable slidable contact between the slide rail 12 and the guide rail 11, free of binds that previously were associated with assemblies using plastic bushings. In the preferred embodiment the bushings are formed from high density polyethylene, although any of a number of well known, non-corrosive, anti-friction bearing materials may be used.

The roller 17 is contained within the second bottom U-shaped channel 44. During normal conditions with weight on the vehicle seat, the roller bears a majority of the vertical force exerted on the bearing surfaces of the assembly. The physical arrangement of the component parts of the assembly with the roller situated as described, and contacting the bottom side wall 35 of the slide rail 12, provides the sliding ease required and allows for both manual and power operation of the basic seat adjuster assembly.

Figure 4:
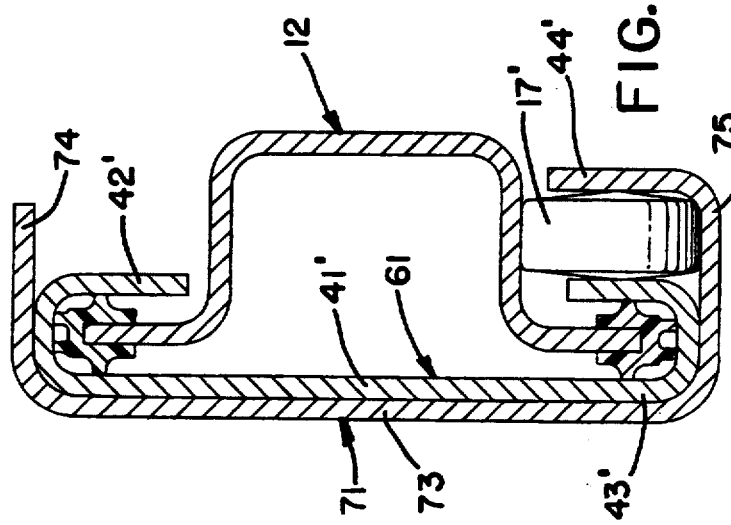
FIG. 4 is a partial schematic sectional view of a second preferred embodiment of a seat adjuster slide assembly with a two piece guide rail taken similarly as FIG. 3.

Referring now to FIG. 4, an alternative embodiment of the invention is shown. Although substantially the same as the embodiment described in FIG. 3, the guide rail is assembled from two separate components. The inner formed section 61, includes a vertical base wall 41' and upper and lower integrally formed U-shaped channels 42' and 43' resulting generally in a C-shaped configuration. The upper and lower channels 42' and 43' serve the same functions as described in relation to FIG. 3, concerning the top U-shaped channel 42 and the first bottom U-shaped channel 43, providing an engagement mechanism for the slide rail. The outer formed section 71, includes a vertical base wall 73, a top bend forming a longitudinal flange 74 substantially perpendicular to the base wall 73, and a bottom L-shaped channel portion 75 extending longitudinally and opening upwardly. The outer formed section 71, is designed to allow the inner formed section 61, to nest within its bounded area with the outside surface of the inner section's base wall abutting the inner surface of the outer section's base wall. Upon assembly, the bottom L-shaped channel 75 is designed to cooperate with the lower formed channel 43' of the C-shaped inner section to create a second bottom U-shaped channel 44' adjacent to the first channel 43' created by the C-shaped section, equivalent to the second bottom U-shaped channel 44 described in relation to FIG. 3, creating a track for the roller 17'.

The two-piece guide rail construction described is designed to provide additional strength over the one-piece embodiment without using excessively thick stock material when desired. The two formed sections of the guide rail 61 and 71, are preferably welded or fastened together for increased rigidity. The unique arrangement of mating rails, plastic bushings and rollers that exists with the one-piece guide rail embodiment shown in FIG. 3, also results from the two-piece guide rail embodiment as shown in FIG. 4.

Figure 2:
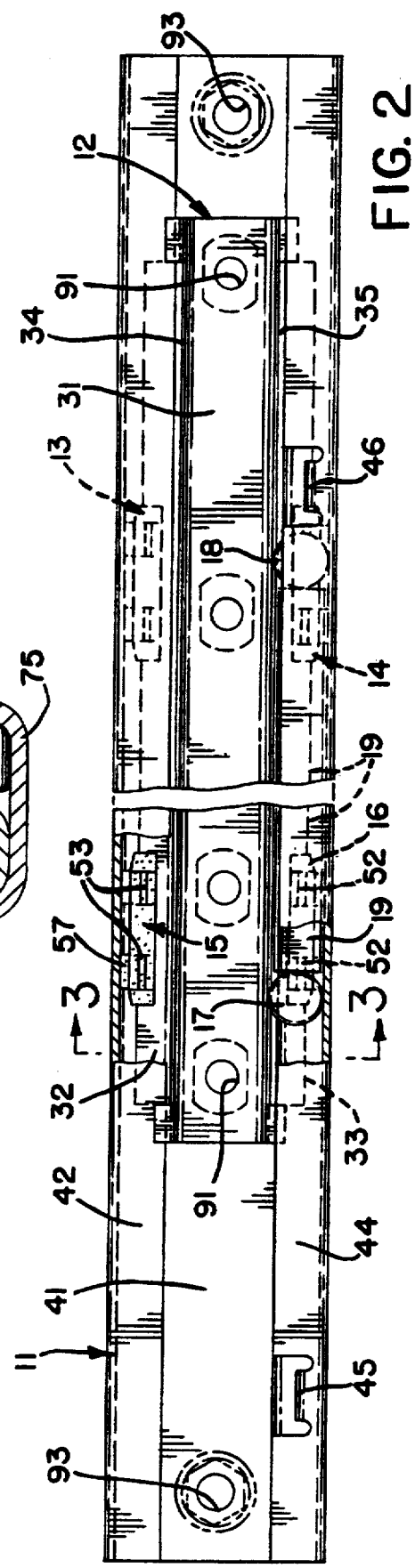
FIG. 2 is a side elevation view of a seat adjuster slide assembly shown in FIG. 1.

FIG. 2 illustrates the longitudinal nature of the seat adjuster assembly. The depiction is a side elevation of the basic aspects of a seat adjuster mechanism. The guide rail 11, is shown with the top U-shaped channel 42, and the bottom U-shaped channel 44, extending along the rail. Bent tabs 45 and 46 are formed in the channel 44. The tabs act as stops for the movement of the rollers 17 and 18. An appropriate number of rollers is required to provide adequate slidability of the slide rail as is a means of ensuring they remain disposed along the rail. Two rollers 17 and 18 are shown disposed in the channel 44, separated by a spacer 19 to maintain a relative minimum positioning. This arrangement provides the required slidability. One of the tabs 45 or 46 may be pre-bent before the components are assembled. After the Rollers 17 and 18 and the spacer 19 are inserted into the channel 44, and the slide rail 12, and bushings are in place, the second tab may be bent.

The bushings required for stability are shown in FIG. 2 as 13, 14, 15 and 16. They are distributed on the flanges of the slide rail 12, to provide a sound engagement with the guide rail 11. The bushings are preferably held in place on the slide rail flanges while allowed to slide within the channels of the guide rail.

The holes represented by 91 in the face wall of slide rail 12, are for the purpose of illustrating a fastening means for attaching the slide rail to a vehicle seat 10. One method of attaching the slide rail to the seat is by pressing or welding a stud into the hole 91 for attachment to the seat structure. Similarly the holes represented by 93 in the guide rail 11 are for illustrative purposes to show that a means for attaching the guide rail 11 to a vehicle's floor structure 9 is required.

While this invention has been described in terms of preferred embodiments thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A vehicle seat adjuster slide assembly comprising:
   an elongated formed guide rail;
   an elongated formed slide rail slidably coupled to the elongated formed guide rail with a plurality of plastic bushings disposed between the elongated formed guide rail and the elongated formed slide rail and contacting the elongated formed guide rail, each plastic bushing having a cross sectional area and a plurality of projecting longitudinal runners with a solid cross sectional area, wherein each longitudinal runner's cross sectional area is relatively small in relation to that of the plastic bushing wherein the elongated formed slide rail is slidably and stably restrained by the plastic bushings from moving vertically or laterally in relation to the elongated formed guide rail; and
   at least one roller carried between and circumferentially engaging the elongated formed guide rail and the elongated formed slide rail to facilitate relative sliding motion therebetween.

2. A vehicle seat adjuster according to claim 1, wherein the elongated formed guide rail has a vertical base wall connected to the vehicle and the elongated formed slide rail has a vertical face wall connected to the seat;
   wherein the elongated formed guide rail has first, second and third U-shaped channel portions supported by the vertical base wall;
   wherein the first and second U-shaped channel portions slidably contain the polymeric bushings;
   wherein the elongated formed slide rail has two longitudinal flanges;
   wherein the plastic bushings are longitudinally fixed on the longitudinal flanges of the elongated formed slide rail; and
   wherein the third U-shaped channel portion rotatably contains the roller.

3. A vehicle seat adjuster according to claim 2, further comprising a roller spacer contained in the third U-shaped channel.

4. A vehicle seat adjuster assembly according to claim 3, wherein the first U-shaped channel portion diametrically opposes the second U-shaped channel portion transversely from across the vertical base wall of the guide rail and the third U-shaped channel portion is positioned adjacent to the second U-shaped channel portion at the bottom of the vertical base wall portion of the guide rail each channel having an opening facing the inside of the area bounded by the elongated formed guide rail.

5. A vehicle seat adjuster assembly according to claim 4, wherein the elongated formed guide rail and the elongated formed slide rail comprise roll formed sheet metal sections.

6. A vehicle seat adjuster slide assembly comprising:

a guide rail formed from sheet metal for connection to a vehicle the guide rail including;

a substantially vertical base wall;

a formed U-shaped top channel extending substantially along the length of the base wall top creating a receptive cavity opening downwardly adjacent to the base wall;

a pair of formed U-shaped bottom channels parallel and substantially adjacent to one another extending substantially along the length of the base wall bottom creating two receptive cavities opening upwardly, the first formed U-shaped bottom channel situated adjacent to the base wall diametric to the formed U-shaped top channel the second formed U-shaped bottom channel situated on the same side of the base wall further from the base wall than the first formed U-shaped bottom channel;

a slide rail formed from sheet metal for connection to a vehicle seat the slide rail including;

a substantially vertical face wall;

a pair of side walls perpendicular to the face wall longitudinally disposed substantially along the length of the face wall the first side wall along the top of the face wall the second side wall along the bottom of the face wall both projecting toward the guide rail base wall;

a terminal flange extending substantially along each side wall existing in a parallel planar relationship with the face wall the first terminal flange extending upward from the first side wall located in a spaced paired relationship to the receptive cavity of the formed U-shaped top channel of the guide rail, the second terminal flange extending downward from the second side wall located in a spaced paired relationship to the receptive cavity of the first formed U-shaped bottom channel of the guide rail;

two upper and two lower plastic bushings including a plurality of longitudinal runners projecting along each bushing, slidably containing the terminal flanges of the slide rail within the opposing top and first bottom formed U-shaped channels of the guide rail;

a plurality of cylindrical rollers rotatably contained within the second bottom channel circumferentially engaging the second side wall of the slide rail for aiding sliding movement; and spacing means separating the cylindrical rollers.

* * * * *